United States Patent [19]

Nagayama

[11] Patent Number: 5,195,854
[45] Date of Patent: Mar. 23, 1993

[54] TEE NUT

[75] Inventor: Yutaka Nagayama, Osaka, Japan

[73] Assignee: Nagayama Electronic Industry Co. Ltd., Wakayama, Japan

[21] Appl. No.: 809,765

[22] Filed: Dec. 18, 1991

[30] Foreign Application Priority Data

Jun. 21, 1991 [JP] Japan .................................. 3-149027

[51] Int. Cl.$^5$ ............................................. F16B 37/00
[52] U.S. Cl. ...................................... 411/427; 411/176
[58] Field of Search ............... 411/427, 176, 177, 179, 411/180, 181, 183

[56] References Cited

U.S. PATENT DOCUMENTS

| 3,270,610 | 9/1966 | Knowlton | 411/427 |
| 3,480,061 | 11/1969 | Leistner | 411/177 |
| 4,508,478 | 4/1985 | Leistner | 411/427 X |

FOREIGN PATENT DOCUMENTS 1157734  7/1969  United Kingdom .

*Primary Examiner*—Rodney M. Lindsey
*Attorney, Agent, or Firm*—W. G. Fasse

[57] ABSTRACT

A tee nut is integrally made of a metallic material to have a shaft portion and a flange portion, the latter having two pairs of pawls projecting in the direction in which the shaft portion extends. The pawls are disposed radially of the flange portion. The peripheral edge of the flange portion is formed with projections at position diametrically opposed to each other and at right angles with the radial direction in which the two pairs of pawls are opposed to each other. The projections extend in the same direction as that in which the pawls extend namely toward the free end of the shaft-portion. The clearances in guide rails of C-shaped cross-section constituting a feed track, are substantially decreased in size by the presence of the pointer projections producing a decreased frictional resistance between the track and nuts travelling on the track overlapping of the flange portions due to the rise of the flange portions in the guide rails is prevented, thus ensuring a smooth movement of the tee nut along the feed track.

4 Claims, 4 Drawing Sheets

TEE NUT

BACKGROUND OF THE INVENTION

1. Field of the Invention

This invention relates to a tee nut and particularly to a tee nut having a female thread formed on the inner peripheral surface of a hollow shaft portion and a plurality of pawls formed on a flange projecting outwardly from one end of said shaft portion.

2. Background Information

A conventional tee nut 1 of interest to the invention is shown in a perspective view in FIG. 6. FIG. 7 is a plan view of the tee nut 1.

The tee nut 1 is integrally made of a metallic material, comprising a shaft portion 2 and a flange portion 3 outwardly projecting from a first end of said shaft portion 2. The shaft portion 2 is in the form of a hollow cylindrical body internally formed with a female thread 4.

The flange portion 3 has two pairs of pawls 5 and 6, and 7 and 8 extending from a second end opposite to said first end, and opposed to each other radially of the flange portion 3. Of these pawls 5 to 8, those forming pairs, i.e., 5 and 6, and 7 and 8, are constructed by forming pairs of cuts extending in mutually opposite directions in the peripheral edge of the flange portion 3 to form tongues and bending said tongues at the ends of the cuts.

Such tee nut 1 is fixed to a member to be secured, such as wood, by inserting the shaft portion 2 into a hole drilled prior to the inserting in said member and driving the pawls 5 to 8 into the member. When the tee nut 1 is fixed to the member in this manner, the rotation of the tee nut 1 is inhibited and a threaded member, such as a bolt, can be threadedly engaged with the female thread 4 formed in the inner peripheral surface of the shaft portion 2.

Such tee nut 1 is generally called a "hopper feed tee nut", because the tee nut 1 shown in FIGS. 6 and 7 can be smoothly moved along a feed track installed on a fixing machine for fixing the tee nut 1 to the wood. The smooth movement permits an automatic feeding of the nuts 1 to an insertion tool. In addition, the details of one type of hopper feed tee nut are disclosed, for example, in British Patent No. 1,157,734.

FIG. 8 shows a plurality of tee nuts 1 being fed along a feed track 9. The feed track 9 has a guide rail 10 of C-shaped cross section. Another guide rail, not shown, is symmetrically disposed in opposed relation to the guide rail 10, and the tee nuts 1 are moved along the feed track 9 with the flange portions 3 received in these guide rails 10 and with the pawls 5 to 8 positioned between said guide rails 10. The feed track 9, as shown in FIG. 8, is often bent, whereby the tee nuts 1 are caused to assume desired positions so that the shaft portions 2 are disposed to be inserted into holes formed in the member to which the nut is to be inserted.

However, when the tee nuts 1 are moved along the feed track 9, particularly when they are moved along a bent portion of the feed track 9, the tee nuts 1 tend to ride on each other, as shown in FIG. 9. This often causes misalignments or clogging of the feeding of the tee nuts 1 by the feed track 9.

The phenomenon in which the flange portions 3 ride on each other can be prevented to some extent by decreasing the size of the clearances given to the flange portions 3 in the guide rails 10 constituting the feed track 9. Such decrease in the size of the clearances, however, causes the frictional resistance between the flange portions 3 and the guide rails 10 to increase to the extent of making it impossible to move the tee nuts 1 smoothly along the feed track 9.

SUMMARY OF THE INVENTION

Accordingly, it is an object of the invention to provide a tee nut constructed to be smoothly moved in a feed tack.

This invention is directed to a tee nut integrally made of a metallic material, comprising a shaft portion and a flange portion projecting outwardly from a first end of said shaft portion, said shaft portion being in the form of a hollow cylindrical body internally formed with a female thread, said flange portion having two pairs of pawls extending toward a second end opposite to said first end wherein the pawls are opposed to each other radially of the flange portion, said tee nut being characterized in that the peripheral edge of said flange portion is formed with projections at positions diametrically opposed to each other and in a radial direction which is at right angles with the radial direction in which said two pairs of pawls are diametrically opposed to each other and, said projections extending toward said second end, whereby the above problems are avoided.

When tee nuts according to this invention are moved along the feed track, the projections can contact the guide rails of C-shaped cross section receiving the flange portion, while the flange portion proper substantially does not contact the guide rail. Any contact that does occur between the guide rails and the flange portion is only a point or a small area contact, so that the frictional resistance during movement of the tee nut can be decreased. Therefore, the tee nut can be smoothly moved along the feed track.

Further, the presence of the projections substantially decreases the clearances in the guide rails. Therefore, the flange portions of the tee nuts are prevented from riding on each other, so that the possibility of causing misalignments or clogging in the feeding of tee nuts can be decreased. This also contributes to a smooth feeding of tee nuts.

Further, since the projections extend in the same direction as the pawls, in the final stage of the operation for driving the pawls into a member to be fixed, the projections can also be driven into the member; thereby strengthening the connection between the member and the nut.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
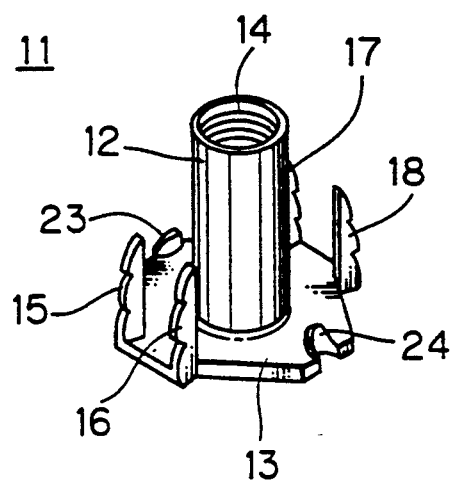
FIG. 1 is a perspective view showing a tee nut according to an embodiment of the invention.
Figure 2:
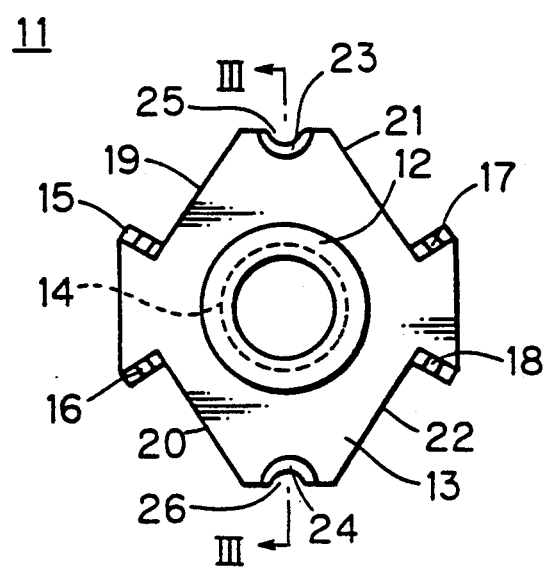
FIG. 2 is a plan view of the tee nut 11 shown in FIG. 1.
Figure 3:
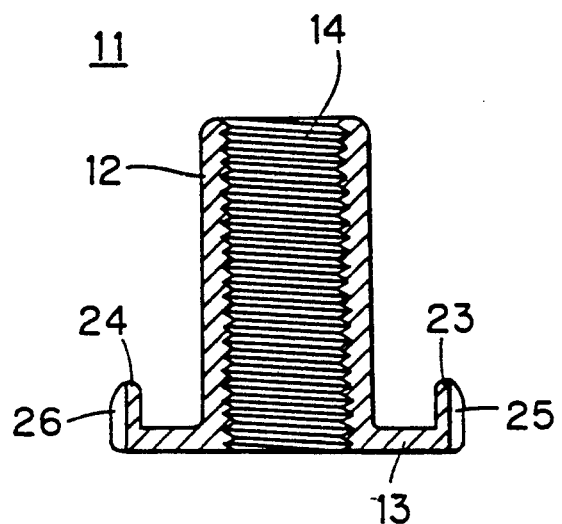
FIG. 3 is a sectional view taken along the line III—III in FIG. 2.

Referring to FIGS. 1, 2, and 3, the tee nut 11 is integrally made as by working a metallic sheet of the iron type. The nut 11 has a shaft portion 12 and a flange portion 13 outwardly extending from a first end of said shaft portion 12.

The shaft portion 12 is a hollow cylindrical body internally formed with a female thread 14.

The flange portion 13 has two pairs of pawls 15 and 16, and 17 and 18 extending toward a second end, opposite to the first end, and opposed to each other radially of the flange portion 13. Of these pawls 15 to 18, those forming pairs, i.e., 15 and 16, and 17 and 18, are constructed by forming pairs of cuts in the peripheral edge of the flange portion with pairs of cuts extending in mutually opposite directions. The cut lines defined by these cuts are denoted by 19, 20, 21 and 22 in FIG. 2, whereby the cut lines 19 and 20 form a pair of pawls 15, 16 and extend in mutually opposite directions, while the cut lines 21 and 22 form a further pair of pawls 17, 18 and extend in mutually opposite directions. The resulting the tongues defined by said cuts are then bent at the terminal ends of said cuts to form said pawls. The pawls of a pair have a small circumferential spacing from each other, while the pairs of pawls have a larger circumferential spacing from each other along a larger flange segment.

The peripheral edge of the flange portion 13 forming the larger circumferential flange segments between pairs of pawls is provided with projections 23 and 24 at positions diametrically opposed to each other and in a radial direction which is at right angles with the radial direction in which said two pairs of pawls 15 and 16 and 17 and 18 are diametrically opposed to each other. Thus, the on-center spacing between a projection 23, 24 and a neighboring pair of pawls is about 90°. These projections 23 and 24 are formed by inwardly crushing part of the outer peripheral edge of the flange portion 13 whereby the projections 23 and 24 extend toward said second end. The formation of the projections 23 and 24 can be easily effected for example by press work subsequently to the formation of the pawls 15 to 18. The outer peripheral edge of the flange portion 13 has substantially semicircular notches 25 and 26 left therein as a result of the formation of the projections 23 and 24.

When the projections 23 and 24 are formed by crushing, as described above, sharp tips can be easily provided, decreasing the frictional resistance to the feed track.

In addition, the method of forming the projections 23 and 24 is not limited to the one described above; they may be formed by bending, for example.

In this embodiment, the pawls 15 to 18 are serrated, whereby the pawls are more securely anchored into a member to be fixed and cannot be easily pulled out of said member.

Figure 4:
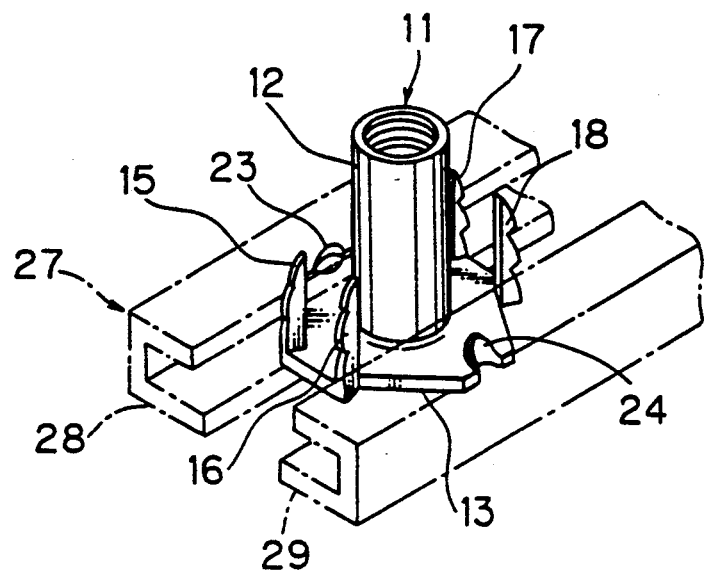
FIG. 4 is a perspective view showing the tee nut of FIG. 1 being fed along a feed track.
Figure 5:
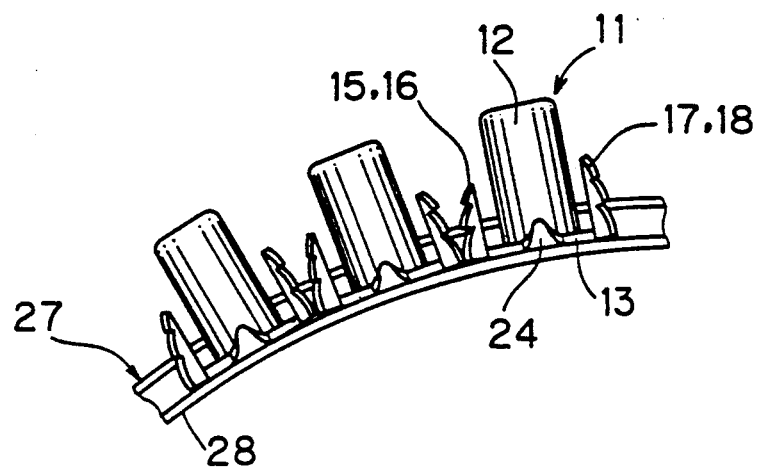
FIG. 5 is a front view showing a plurality of tee nuts such as the one shown in FIG. 1 being fed in a line along the feed track, one guide rail being omitted from the figure.
Figure 6:
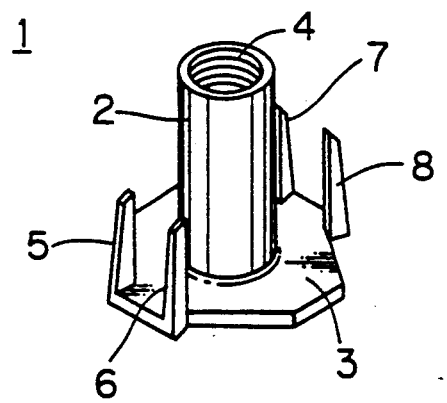
FIG. 6 is a perspective view of a conventional tee nut of interest to this invention.
Figure 7:
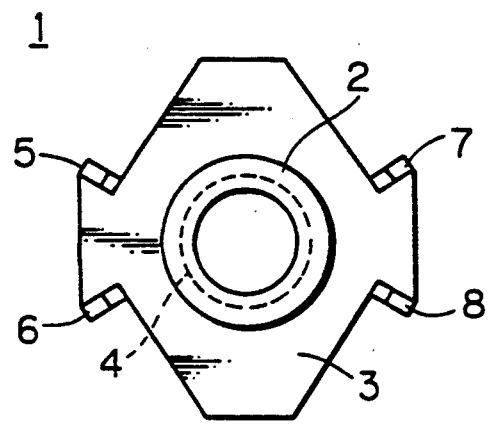
FIG. 7 is a plan view of the tee nut shown in FIG. 6.
Figure 8:
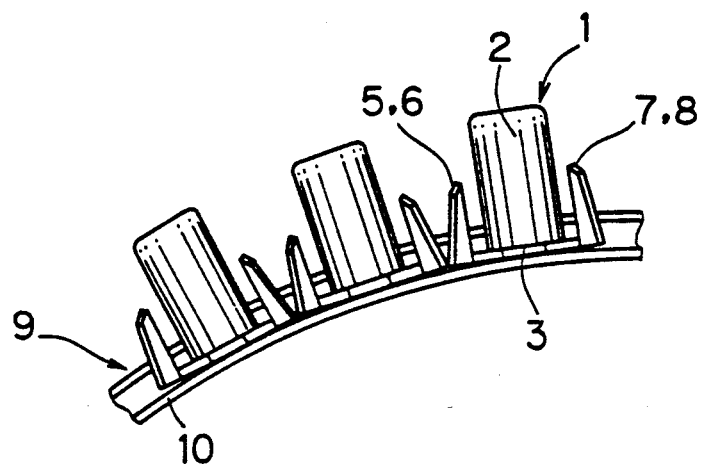
FIG. 8 is a front view showing a plurality of tee nuts, such as the one shown in FIG. 6, being fed in a line along a feed track, one guide rail being omitted from the figure.
Figure 9:
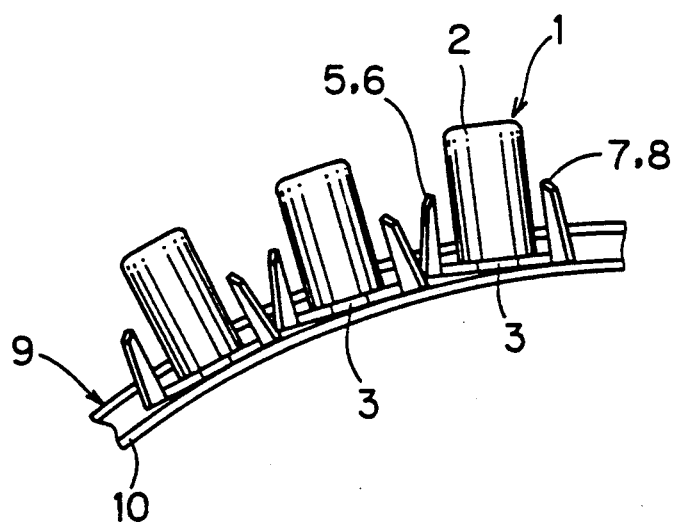
FIG. 9 is a view corresponding to FIG. 8 showing some flange portions riding on others.

FIG. 4 shows the tee nut 11 moving along a feed track 27. FIG. 5 shows a plurality of tee nuts 11 moving in a line along the feed track 27.

As in the case of the feed track 9 described above, the feed track 27 comprises a pair of symmetrically disposed guide rails 28 and 29 of C-shaped cross-section. With the flange portion 13 received in these guide rails 28 and 29 and with the pawls 15 to 18 positioned between the guide rails 28 and 29, the tee nut 11 is moved along the feed track 27. The projections 23 and 24 formed on the flange portion 13 are positioned in the guide rails 28 and 29. In this position, as can be seen in FIG. 5, as a result of the presence of the projections 23 and 24, there is almost no clearance between the projections and the guide rails 28 and 29.

Therefore, the tee nut 11 is prevented from rising in the guide rails 28 and 29, and hence the flanges 13 are prevented from riding on each other. Further, even when the projections 32 and 24 contact the guide rails 28 and 29, the frictional resistance can be minimized since the projections 23 and 24 have pointed tips. For these reasons, the tee nut 11 moves smoothly along the feed track 27.

Further, the projections 23 and 24 contribute to the smooth movement of the tee nut 11 in the following manner. When the pawls 15, 16, 17 and 18 are formed by making cuts along the cut lines 19, 20, 21 and 22 shown in FIG. 2, the flange portion 13 is often formed with burrs projecting in the same direction as that of the pawls 15 through 18 along the cut lines 19, 20, 21 and 22. The presence of burrs interferes with the smooth movement of the tee nut along the feed track 27. Usually, effort is made to remove such burrs by barrel polishing. Complete removal of such burrs, however, is not so easy. According to this embodiment, even if the removal of burrs is incomplete or such removal is not made at all, the projections 23 and 24 can be extended higher than the burrs, making it possible to prevent the presence of burrs from interfering with a smooth movement of the tee nut 1 along the feed track 27. Therefore, the cost for the finishing process for the tee nut 11 including barrel finishing has been minimized.

Although the present invention has been described and illustrated in detail, it is clearly understood that the same is by way of illustration and example only and is not to be taken by way of limitation, the scope of the present invention being limited only by the terms of the appended claims.

What is claimed is:

1. A tee nut integrally made of a metallic material, comprising a shaft portion and a flange portion projecting outward from a first end of said shaft portion, said shaft portion having a hollow cylindrical body internally formed with a female thread, said flange portion having two pairs of pawls extending toward a second end opposite to said first end of said shaft portion, said pairs of pawls being positioned diametrically opposite to each other and substantially radially outwardly of the flange portion, wherein pawls of a pair have a small circumferential spacing from each other, and pairs of pawls are spaced from each other by circumferential flange segments having a circumferential length larger than said small circumferential spacing between pawls of a pair, and projections in said circumferential flange segments at positions diametrically opposed to each other, said projections having an on-center circumferential spacing of about 90° from a neighboring pair of pawls, said projections extending toward said second end of said shaft portion.

2. The tee nut as set forth in claim 1, wherein said projections are formed by outwardly crushing part of the outer peripheral edge of said flange portion.

3. The tee nut as set forth in claim 1, wherein free ends of said projections are pointed.

4. The tee nut as set forth in claim 1, wherein said pawls are serrated.

* * * * *